(12) United States Patent
Krampe

(10) Patent No.: US 9,790,923 B2
(45) Date of Patent: Oct. 17, 2017

(54) ROBOT FOR INSPECTING ROTOR BLADES OF WIND ENERGY INSTALLATIONS

(71) Applicant: Karl-Heinz Krampe

(72) Inventor: Susanne Krampe, Münster (DE)

(73) Assignees: Nina Katharina Krampe (DE); Timothy Krampe (DE)

( * ) Notice: Subject to any disclaimer, the term of this patent is extended or adjusted under 35 U.S.C. 154(b) by 95 days.

(21) Appl. No.: 14/435,483

(22) PCT Filed: Oct. 16, 2013

(86) PCT No.: PCT/DE2013/000604
§ 371 (c)(1),
(2) Date: Apr. 14, 2015

(87) PCT Pub. No.: WO2014/059964
PCT Pub. Date: Apr. 24, 2014

(65) Prior Publication Data
US 2015/0267688 A1 Sep. 24, 2015

(30) Foreign Application Priority Data

Oct. 16, 2012 (DE) .................... 20 2012 009 844 U
Apr. 19, 2013 (DE) ........................ 10 2013 006 867

(51) Int. Cl.
*F03D 1/00* (2006.01)
*F03D 11/00* (2006.01)
(Continued)

(52) U.S. Cl.
CPC ........... *F03D 11/0091* (2013.01); *B25J 11/00* (2013.01); *F03D 17/00* (2016.05); *F03D 80/50* (2016.05);
(Continued)

(58) Field of Classification Search
None
See application file for complete search history.

(56) References Cited

U.S. PATENT DOCUMENTS

2006/0175465 A1 8/2006 Teichert
2009/0173573 A1 7/2009 Teichert
(Continued)

FOREIGN PATENT DOCUMENTS

DE 10 2010 046 493 B3 3/2012
KR 101252080 B1 * 4/2013
(Continued)

OTHER PUBLICATIONS

International Search Report issued in related International Application No. PCT/DE2013/000604, dated Feb. 24, 2014.

*Primary Examiner* — Thomas G Black
*Assistant Examiner* — Demetra Smith-Stewart
(74) *Attorney, Agent, or Firm* — RatnerPrestia

(57) ABSTRACT

A robot serves for inspecting rotor blades of wind energy installations. A frame construction includes an inner opening surrounding a rotor blade during use and a plurality of propellers for a vertical flying movement of the robot. A rotor blade state detection system disposed at the frame construction detects the state of the rotor blades. Preferably a power and/or data cable is provided for connecting the robot during use to a control and evaluation station provided, for example, on the ground.

11 Claims, 14 Drawing Sheets

(51) Int. Cl.
  *B25J 11/00*     (2006.01)
  *F03D 17/00*     (2016.01)
  *F03D 80/50*     (2016.01)

(52) U.S. Cl.
  CPC .. *B64C 2201/027* (2013.01); *B64C 2201/127* (2013.01); *F05B 2270/8041* (2013.01); *Y02E 10/72* (2013.01); *Y02E 10/721* (2013.01); *Y10S 901/44* (2013.01); *Y10S 901/47* (2013.01)

(56) References Cited

U.S. PATENT DOCUMENTS

| | | | |
|---|---|---|---|
| 2010/0103260 A1* | 4/2010 | Williams | H04N 7/185 348/144 |
| 2010/0132137 A1* | 6/2010 | Eggleston | B08B 1/02 15/21.1 |
| 2011/0090110 A1 | 4/2011 | Tralshawala et al. | |
| 2011/0127109 A1* | 6/2011 | Teichert | F03D 1/003 182/19 |
| 2011/0178727 A1* | 7/2011 | Hafenrichter | G01M 5/0016 702/38 |
| 2011/0318496 A1* | 12/2011 | Jensen | F03D 80/55 427/427.3 |
| 2012/0003089 A1* | 1/2012 | Byreddy | B08B 1/00 416/61 |
| 2012/0136630 A1* | 5/2012 | Murphy | G05D 1/0094 702/188 |
| 2012/0300059 A1* | 11/2012 | Stege | F03D 17/00 348/114 |
| 2013/0300855 A1* | 11/2013 | Fritz | G01N 21/954 348/82 |
| 2015/0135459 A1* | 5/2015 | Lee | F03D 11/0016 15/246 |
| 2016/0286128 A1* | 9/2016 | Zhou | H04N 5/23248 |

FOREIGN PATENT DOCUMENTS

| | | | | |
|---|---|---|---|---|
| PL | EP 2940298 A1 * | 11/2015 | ............ | F03D 17/00 |
| PT | WO 2017050893 A1 * | 3/2017 | ............ | B64C 39/00 |

* cited by examiner

ROBOT FOR INSPECTING ROTOR BLADES OF WIND ENERGY INSTALLATIONS

RELATED APPLICATIONS

This application is the U.S. National Stage Entry of International Application No. PCT/DE2013/000604, filed Oct. 16, 2013, which claims the benefit of priority of German Application No. 10 2013 006 867.3, filed Apr. 19, 2013 and German Application No. 20 2012 009 844.6, filed Oct. 16, 2012. The entire contents of International Application No. PCT/DE2013/000604, German Application No. 10 2013 006 867.3 and German Application No. 20 2012 009 844.6 are incorporated by reference herein.

FIELD

The invention relates to the use of robots including advanced inspection technology for complete state detection of the rotor blades of wind energy installations (WEI).

BACKGROUND

In general, the service of wind energy installation blades at high altitudes poses a challenge to the workforce and to industry. In the case of optical in situ inspection of the rotors at least two skilled workers are necessary, wherein per day the blades of only one or maximally two wind energy installations can be inspected.

SUMMARY

It is possible to automate the rotor blade service by the flying robot according to the invention which can also be referred to as service copter.

In this case the service intervals of wind energy installation blades can be automated and the maintenance costs can be reduced.

The robot for inspecting rotor blades of wind energy installations according to the invention preferably comprises a frame construction including an inner opening which surrounds a rotor blade during use and a plurality of propellers for a vertical flying movement of the robot as well as a rotor blade state detection system arranged on the frame construction.

Preferably a cable can be provided as power cable and optionally also as data cable for connecting the robot during use to a ground-based, vehicle-based or building-based station which serves for power supply to the robot during flying or floating operation, provides the required operating voltage and power for the robot flight operation and can be configured e.g. in the form of a control and evaluation station which in addition generates the control signals for the robot control e.g. for the flight height, velocity, flight direction, trimming etc. and transmits the same to the robot via the cable. This preferably mobile station, power supply station or control and evaluation station can be arranged e.g. directly on the ground or else at or inside a building or else in a mobile manner at or on a vehicle and can send or transmit the control signals required for the flight control and alternatively or additionally can receive and evaluate, where appropriate, the e.g. electromagnetic, optical or acoustic measuring signals detected during inspection of the rotor blades.

These measuring signals can also be evaluated directly inside the robot or can be transmitted, alternatively or additionally, via the power cable or else wirelessly by means of a transmitter or transceiver (transmitter/receiver) provided in the robot to a receiver or transceiver of the station, such as the ground station. Furthermore, the control signals required by the robot for the flight control, e.g. for height, position and/or velocity control, can be transmitted via the power cable or else wirelessly by means of a transmitter arranged in the station or the transceiver (transmitter/receiver) to a receiver or to the transceiver of the robot.

The robot may include a docking and/or guiding means for docking and/or guiding the robot to/at the rotor blade so as to achieve precise and damage-free positioning and guiding.

The docking and/or guiding means may include one or more adjustable arms so as to achieve a flexible contact with the rotor blade.

The arms of the docking and/or guiding means can be spring-biased and/or motor-driven, for example.

Preferably, the arms of the docking and/or guiding means are provided with a coating such as buffers or rubber buffers.

The docking and/or guiding means can be arranged, e.g.; on the narrow sides of the frame construction.

The robot may include an inverter or converter being arranged on the frame construction and serving for the conversion of supply voltage fed via the cable. In this way weight reduction is achieved.

Furthermore, the robot may be provided with two or more, preferably four groups each consisting of one or more, preferably four propellers that may be arranged on the two longitudinal sides of the frame construction.

The state detection system can comprise e.g. at least one sensor, at least one camera, at least one camera or inspection device configured for thermography and/or an ultrasonic inspection device.

A system according to the invention can comprise the robot, the cable and the control and evaluation station.

BRIEF DESCRIPTION OF THE DRAWING FIGURES

Hereinafter the invention will be described in greater detail with reference to the drawings.

In FIGS. 1 to 6, different views of a first embodiment of the invention are illustrated.

DETAILED DESCRIPTION

Figure 1:
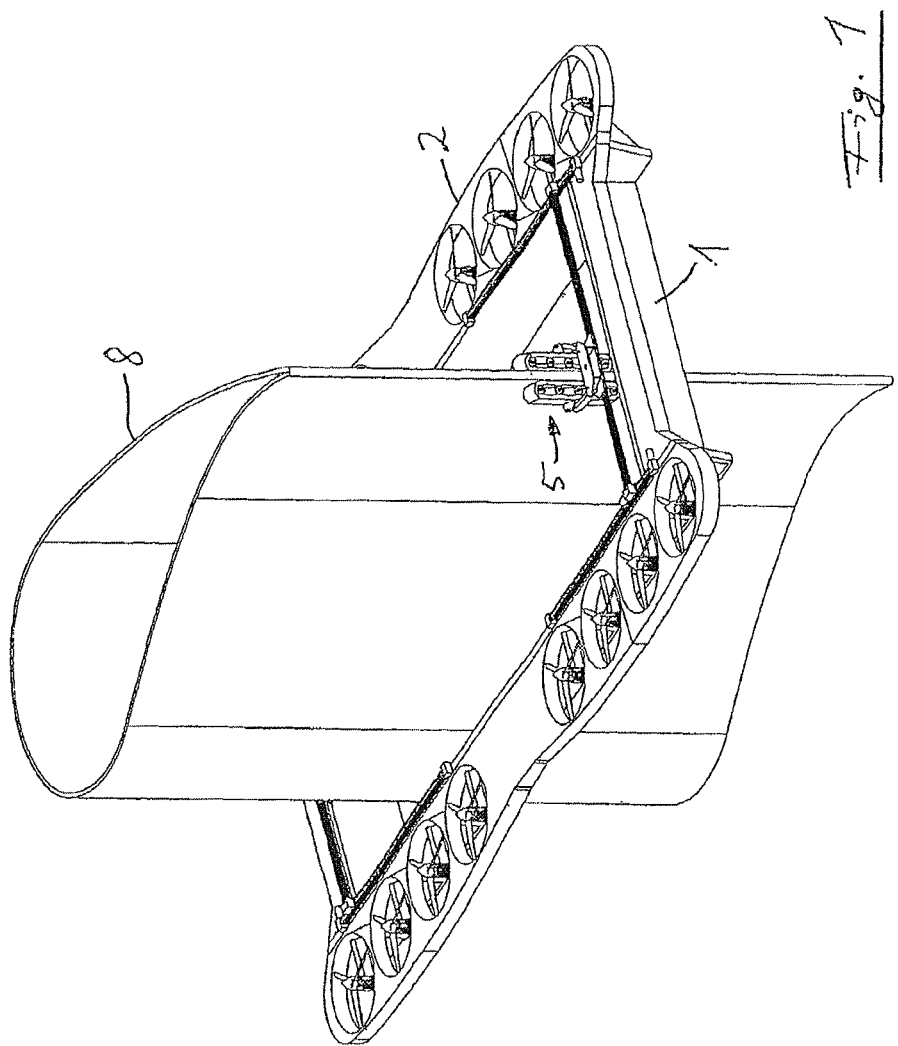
Figure 2:
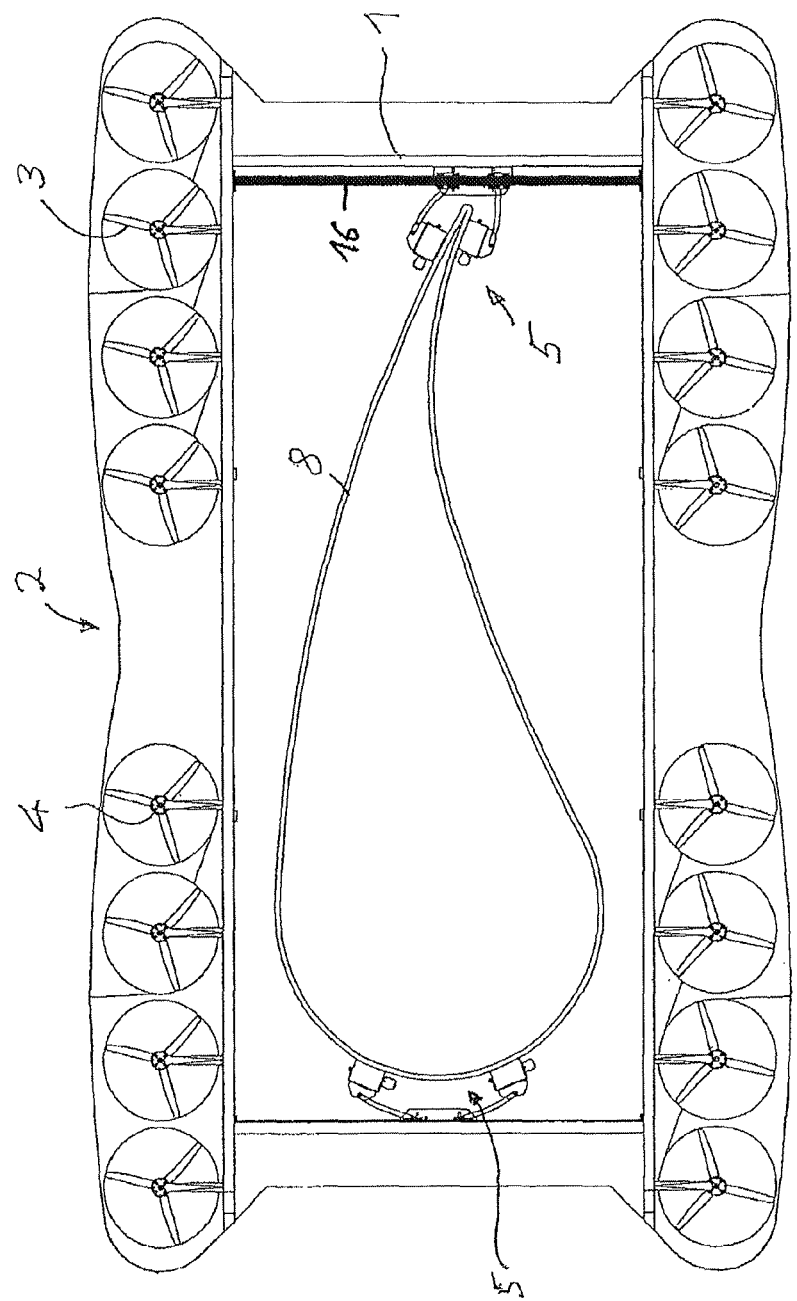
Figure 3:
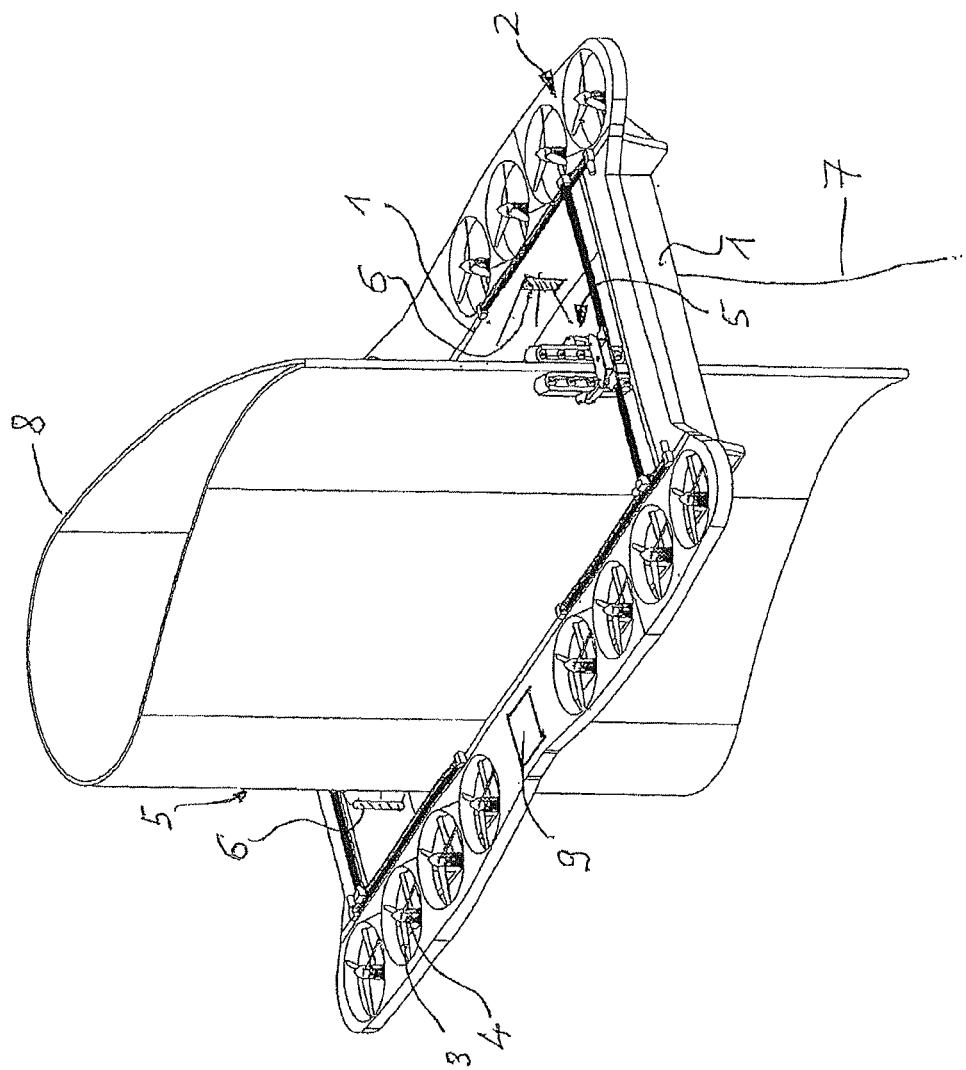
Figure 4:
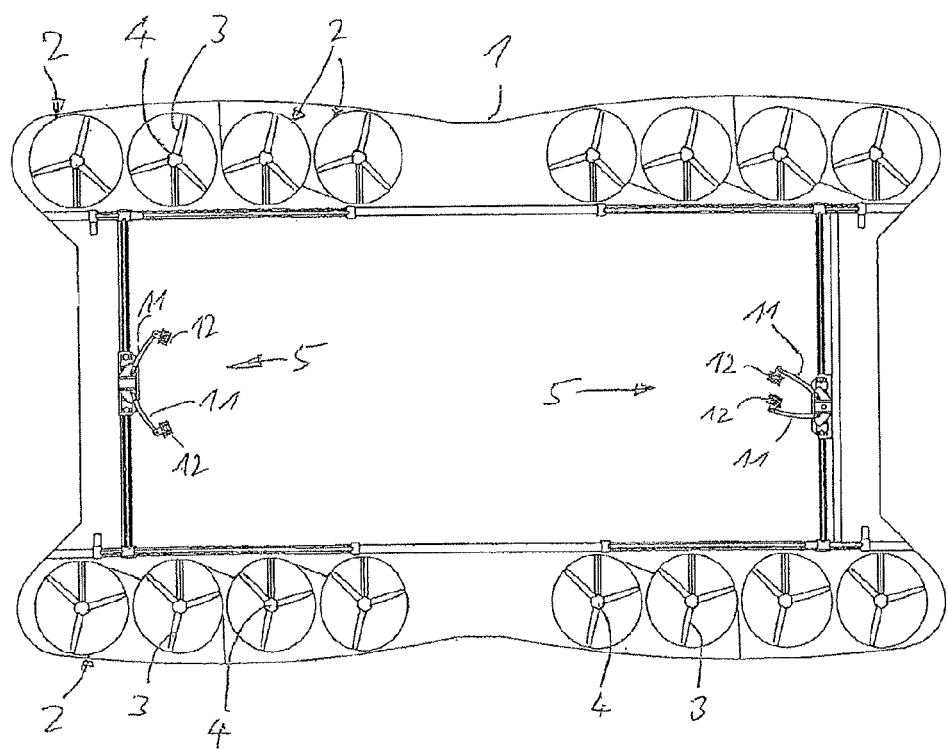
Figure 5:
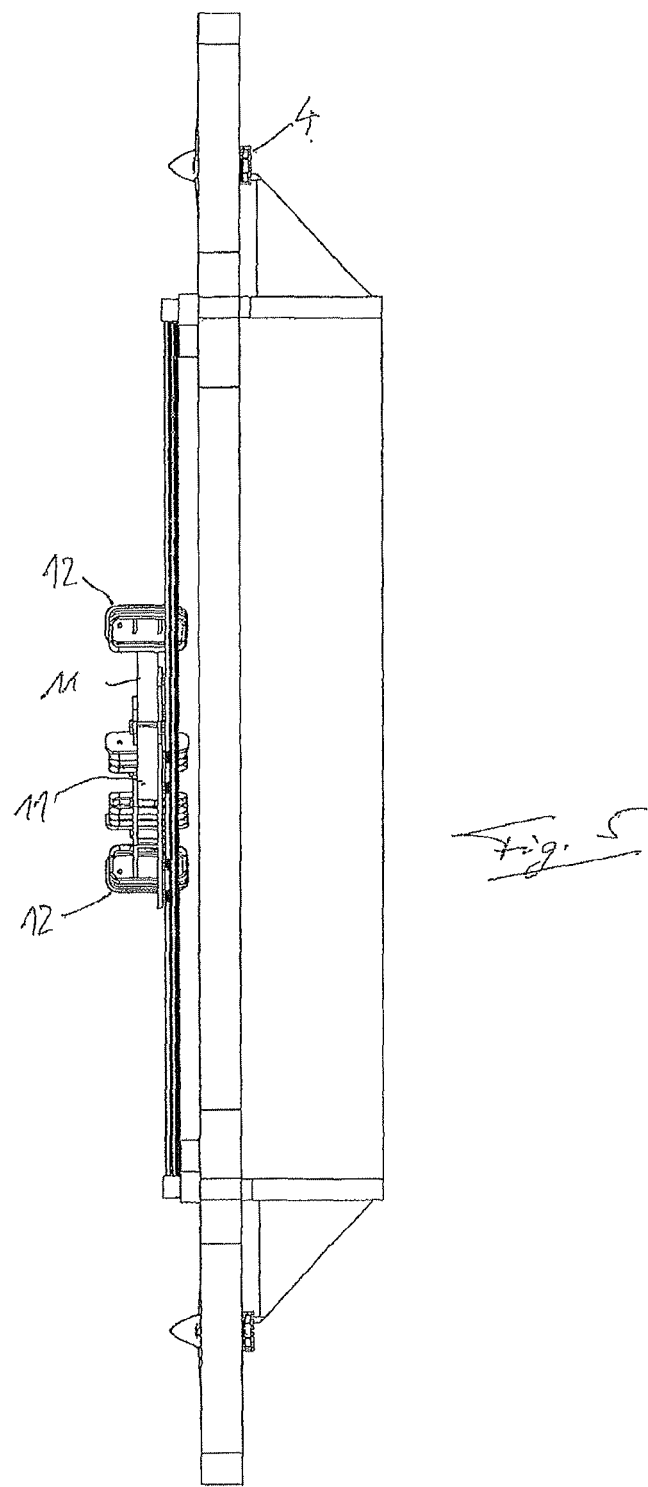
Figure 6:
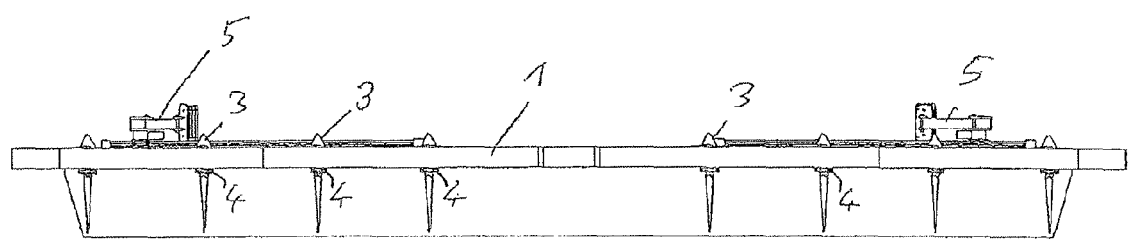

As far as in FIGS. 1 to 14 elements are denoted with equal reference numerals, the following descriptions of these reference numerals are applicable to both embodiments, unless otherwise stated hereinafter. Likewise the general following descriptions are applicable to all of the illustrated and described embodiments, unless otherwise stated hereinafter.

The robot (service copter) according to the invention can be positioned, for example in accordance with FIG. 1, at the upper portion of a rotor blade 8 of a wind energy installation and can be moved along the rotor blade in the vertical direction and, where necessary, additionally or alternatively in the horizontal or inclined direction. The robot comprises a carrier module 1 including aerodynamic drive technology, a drive unit 2 including propellers 3 and a control, a guiding and docking system 5, a rotor blade state detection system 6 and a cable 7 which is connected either fixedly or detachably, e.g. via a plug-in connection, on the one hand to the robot, preferably a device 9 arranged on a frame 1 of the robot, e.g. in the form of a module with a separate housing.

The device 9 may include a converter, e.g. a rectifier or inverter, for converting the AC voltage or DC voltage power supplied from a ground station 10, i.e. the operating power, to the DC voltage or AC voltage required by the robot. Alternatively or additionally, the device 9 can also receive control signals for the robot operation via the cable 7 and/or can feed measuring signals detected during rotor blade inspection into the cable 7 leading to the ground station 10.

The cable 7 can be in the form of a mere power cable for supplying operating power from the fixedly installed or preferably mobile station 10, e.g. arranged on a vehicle such as a truck, as ground station or else in the form of a power and/or data cable for signal transmission between the station and the robot. Alternatively a power cable and a data cable can be jointly guided from the ground station to the robot.

The cable 7 is connected fixedly or detachably, e.g. via a plug-in connection, to the station 10, preferably a device arranged there, for example in the form of a module with a separate housing. The station 10 feeds the DC voltage or AC voltage required by the robot, i.e. the operating power, into the cable 7 and may equally include e.g. a converter, rectifier or inverter. As an alternative or in addition, the station 10 can also generate or forward control signals for the robot operation and transmit them to the robot via the cable 7, or wirelessly via radio communication, and/or receive and/or evaluate and/or store measuring signals detected during rotor blade inspection via the cable 7 or a second cable, or else wirelessly via radio communication.

In one, several or all of the embodiments, visual surface inspection of the rotor blade 8 is possible by one or more video recorders arranged on the robot or by camera.

Alternatively or additionally the surface of the rotor blade 8 can be inspected by infrared thermography.

Alternatively or additionally a device for ultrasonic inspection technology, such as in the case of offshore technology, can be employed.

The robot according to the invention can be used, for example, for different types of WEI.

The invention allows for avoiding catenary suspensions at the gondola. It is not necessary to enter the gondola, either.

In one, several or all of the embodiments, a fully automated process is ensured.

The workforce allocation can be limited to a maximum of one skilled worker who moreover can stay on the ground and therefore need not be especially secured.

The time expenditure for the inspection can be limited to a maximum of 2.5 hours for each WEI. Thus e.g. four inspections per day are possible, whereas in conventional inspections a maximum of two inspections per day are possible.

The robot according to the invention can be moved continuously or stepwise in the vertical direction along the just inspected locked rotor blade preferably positioned in the vertical direction by appropriately driving the rotors and can successively inspect the entire rotor blade from the bottom to the top, or else in the opposite direction.

A carrier module including aerodynamic drive adapted to be used for different WEI is provided as a basis.

The robot includes the carrier module 1 in the form of a frame construction which completely surrounds the rotor blade of the wind energy installation, moves upwards and downwards in a free-floating manner self-contained and independently of catenary suspensions at the WEI gondola or of crane systems at the WEI from the bottom to the WEI rotor blade by means of the aerodynamic drive 2 and at a particular velocity moves along the WEI rotor blade in a free-floating manner from the rotor blade point to the rotor blade root and/or vice versa. The frame construction includes a preferably peripheral closed frame which may be made e.g. of four or more interconnected single frames and is hollow in the middle in the vertical direction so as to accommodate the rotor blade at a horizontal distance. As an alternative, the frame may also take the shape of a U, a diamond, a parallelogram or a polygon or else may be open and have carrier members on three sides only so that it is U-shaped, for example.

In the carrier module 1 of the robot the required sensor system 6, such as cameras, e.g. photographic cameras, video cameras, thermographic infrared cameras and ultrasonic sensors is mounted for preferably contactless scanning and state detection of the WEI rotor blades at required and different positions while being orientated to the position of the rotor blade to be inspected, as exemplified in the drawings. The sensor system 6 serves as rotor blade condition detection system.

The robot includes the aerodynamic drive 2 for a vertical flight movement. The robot is positioned at the WEI rotor blade by means of the aerodynamic drive 2 which is composed of a plurality of propellers 3 including electric motors 4 arranged to be differently spaced in or at the frame 1 and thus is independently capable of flying.

The aerodynamic drive 2 including e.g. two, three, four or more groups each having one or more, such as four, motor-driven propellers 3 can be mounted or installed on two, three or all sides in the carrier module 1 integrated at equal and/or different spaces.

An electronic control 9 of the aerodynamic drive 2 provided at or in the carrier module 1 ensures a uniform distance of the robot from the WEI rotor blade surface. Thus the frame 1 of the robot is prevented from contacting the WEI blade surface. The aerodynamic drive 2 is continuously operated during the complete inspection phase of the rotor blade so as to carry the weight of the robot. The control 9 preferably includes a rectifier or inverter for converting the supply voltage fed from the ground via a cable 7 reaching to the ground into the DC voltage or AC voltage with corresponding voltages required for supply of the electric motors 4. Consequently, the robot need not contain any batteries or accumulators, which causes the total weight to be reduced.

The maximum flight altitude of the robot is limited, by the length of the cable 7 and/or control measures, to e.g. 100 m or the maximum height of the rotor blades so that no flight regulations are endangered.

On two or more, e.g. four sides of the carrier module 1 a guiding and docking system 5 adjustable in plural axes is installed so as to guarantee the positioning and guiding of the robot at the WEI blade 8 even in the case of higher wind speeds. The guiding/docking system 5 serves for fine adjustment and for uniform guiding of the robot at the rotor blade and not for completely taking up the weight of the rotor. This ensures that no unnecessary loads are transferred upon the rotor blade 8 and thus the surface of the rotor blade is kept free from damage.

The or each guiding and docking system 5 includes, for example, arms 11 spring-biased on the opposing narrow sides of the frame 1 which can resiliently get into direct contact with the rotor blade 8 from the two side faces or the broader end face thereof and thus ensure proper uniform guiding along the rotor blade substantially in the vertical direction. Both arms 11, or alternatively only one of the arms, is/are provided with one or more motor-driven guides 12 including one or preferably more toothed belt wheels 14, including one or more motors 19 optionally in the form of electric motors (cf. also FIG. 13, 14) and including one or more rotating toothed belts 13 having a coating to prevent damage such as a rubber or plastic coating or a rubber-plastic coating.

In a further embodiment each guide 12, or at least one or several of the guides 12, includes, instead of toothed belt wheels 14 and toothed belts 13, at least one rotatable motor-driven idle roller (e.g. friction roller) having a coating to prevent damage for each arm 11 which is resiliently pressed directly to the rotor blade 8 by the arm 11 and can be motor-driven by the motor (electric motor) 19 so as to migrate upwards or downwards along the rotor blade and thus to move the frame 1 along.

By direct contact (friction fit) with the rotor blade and the vertical drive the guides 12 cause the robot to climb along the rotor blade in the vertical direction and thus assist the vertical movement of the robot caused by the propellers during upward movement and/or downward movement.

In some embodiments the guides 2 are bearing up to 50%, preferably 5% to 20% of the weight of the robot, whereas the propellers are bearing the remaining parts by weight of the robot. For this purpose, the propeller motors and the electric motors 19 of the guides are jointly controlled by the control device 9 so that this splitting of the weight force is achieved and the vertically directed shares of movement interact in terms of synergy, i.e. they complement one another instead of interfering with one another.

The inspection of the rotor blade starts with a configuration from above so that during use the robot is first moved fully upwards to be floating to the blade root, preferably but not necessarily without contacting the rotor blade 8 and then in the subsequent downward movement and with clamping jaws 12 being applied to the rotor blade 8 the blade inspection is carried out, preferably at a constant or approximately constant rate of descent. For this purpose, in one or more embodiments the clamping jaws can be brought into a strongly or maximally retracted and opened position by the control device 9 during the upward movement, e.g. by motor-driven displacement of travel rails 16 into their outer marginal position distant from the blade and by opening the clamping jaws 12, and the clamping jaws 12 can be displaced prior to or at the beginning of the downward movement into the closed position applied to the rotor blade 8 either motor-driven or by releasing the spring-biased clamping jaws 12. In one or more different embodiments, during both the upward movement and the downward movement the clamping jaws remain continuously in contact with the rotor blade 8 as long as they are level therewith. This facilitates the control, reduces the weight and diminishes the susceptibility to interference.

The inspection of the rotor blade can also be carried out from the bottom to the top, for example, in other embodiments, however.

In other embodiments the arms 11 can be configured without having a separate drive in the form of elements being elastically adjacent to the blade, such as rubber buffers.

In one, several or all embodiments, the arms 11 can also be adjustable by motor-drive, e.g. pivoting inwardly and outwardly in the direction of the rotor blade 8, so as to ensure proper contact with the rotor blade 8 instead of or in addition to a resilient bias to the rotor blade. The arms 11 can be pivoted e.g. in parallel to the surface or the plane of the frame.

Figure 7:
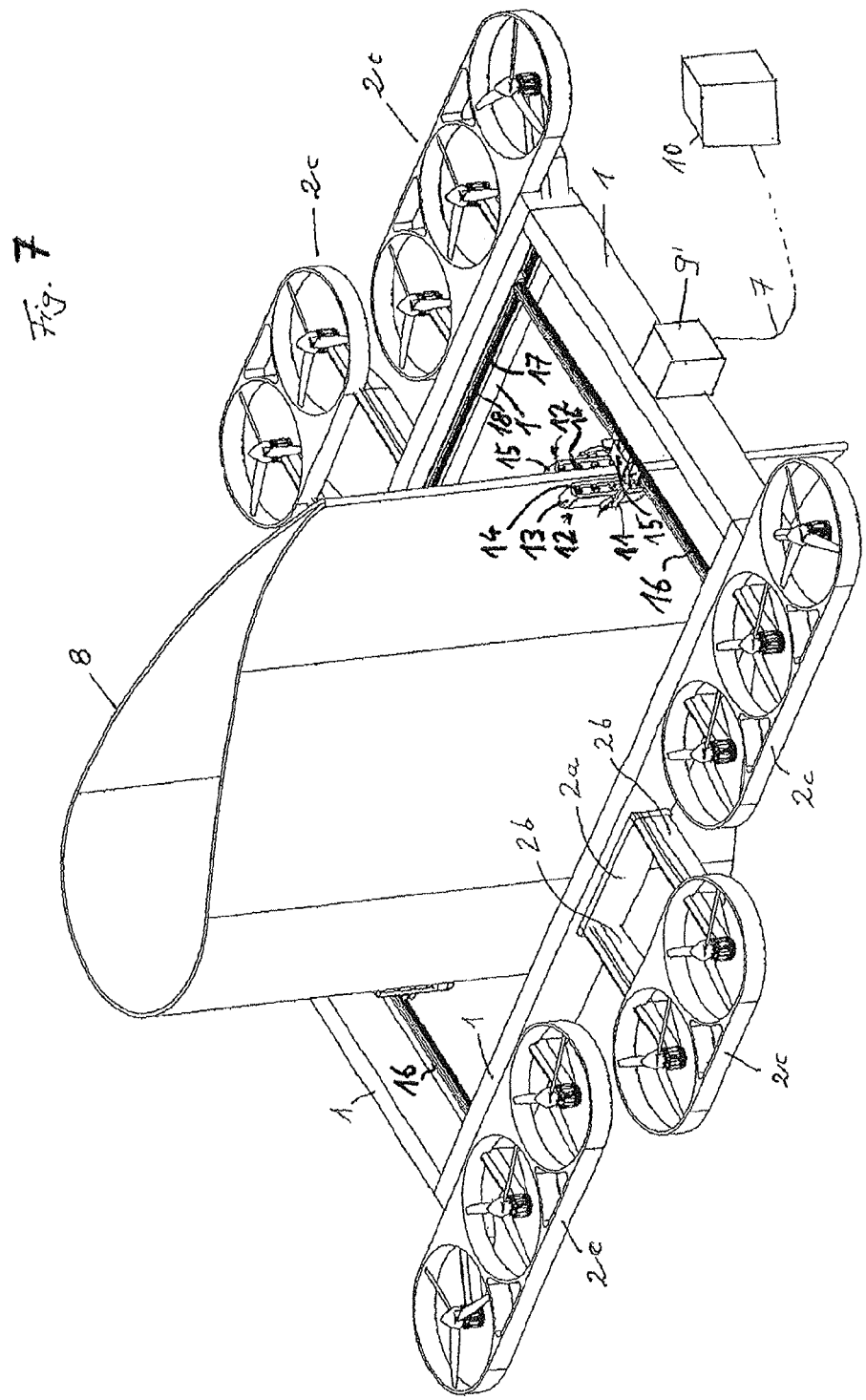
FIGS. 7 to 12 illustrate different views of a second embodiment of the invention having a different propeller arrangement.
Figure 8:
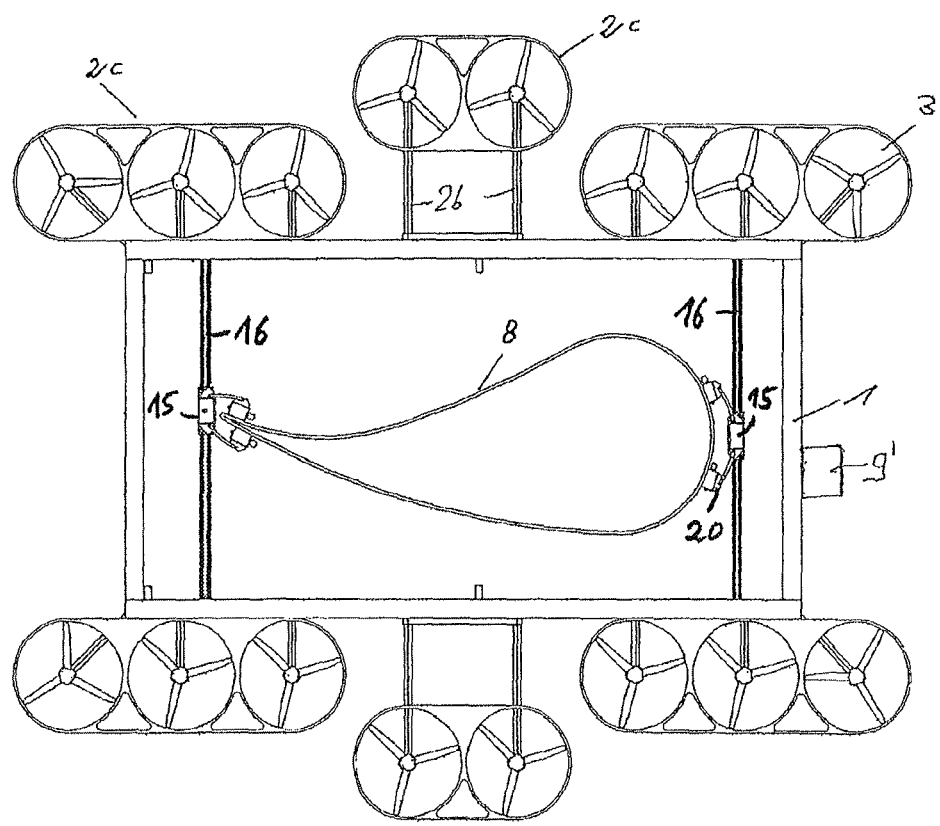
Figure 9:
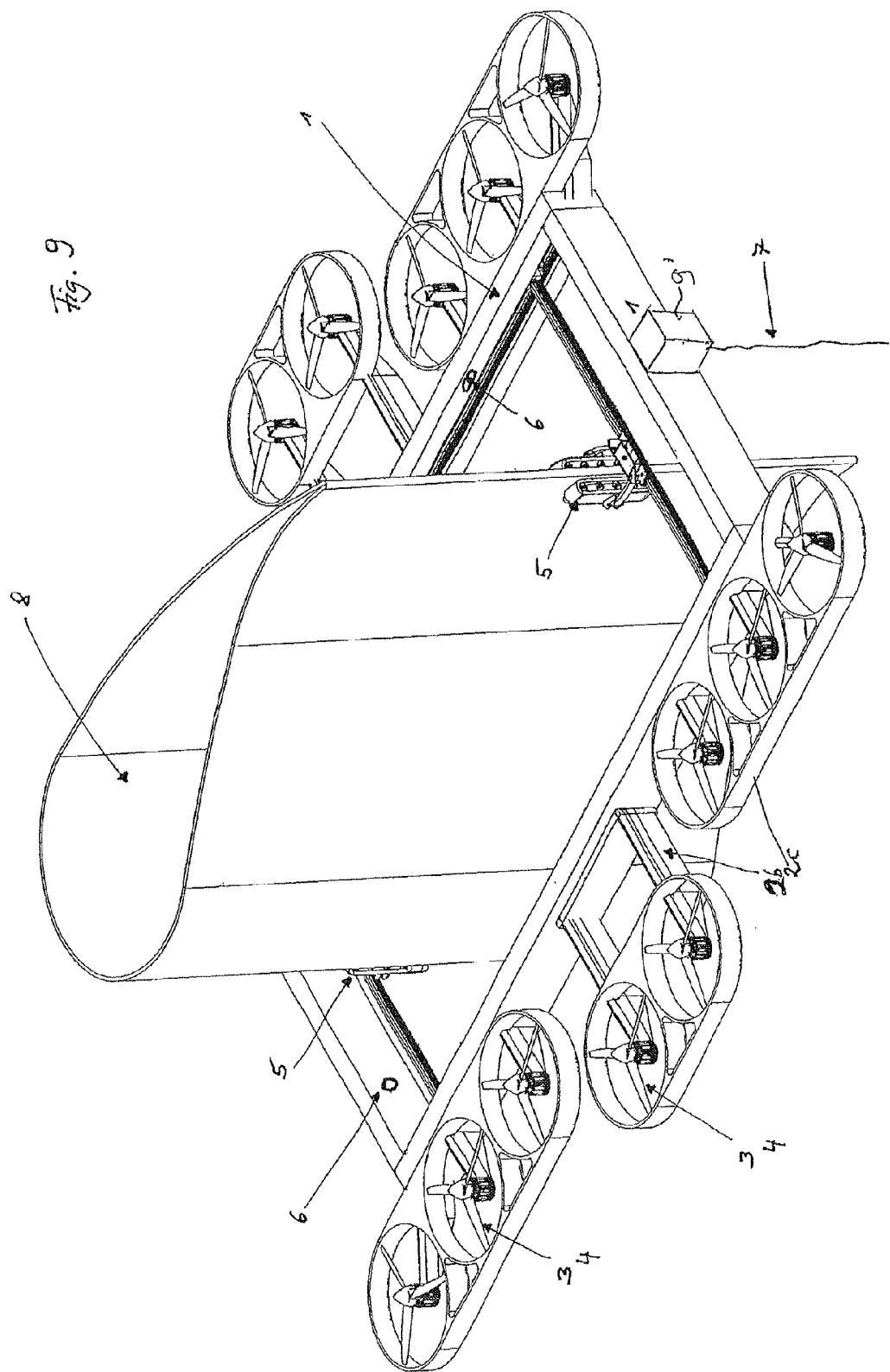
Figure 10:
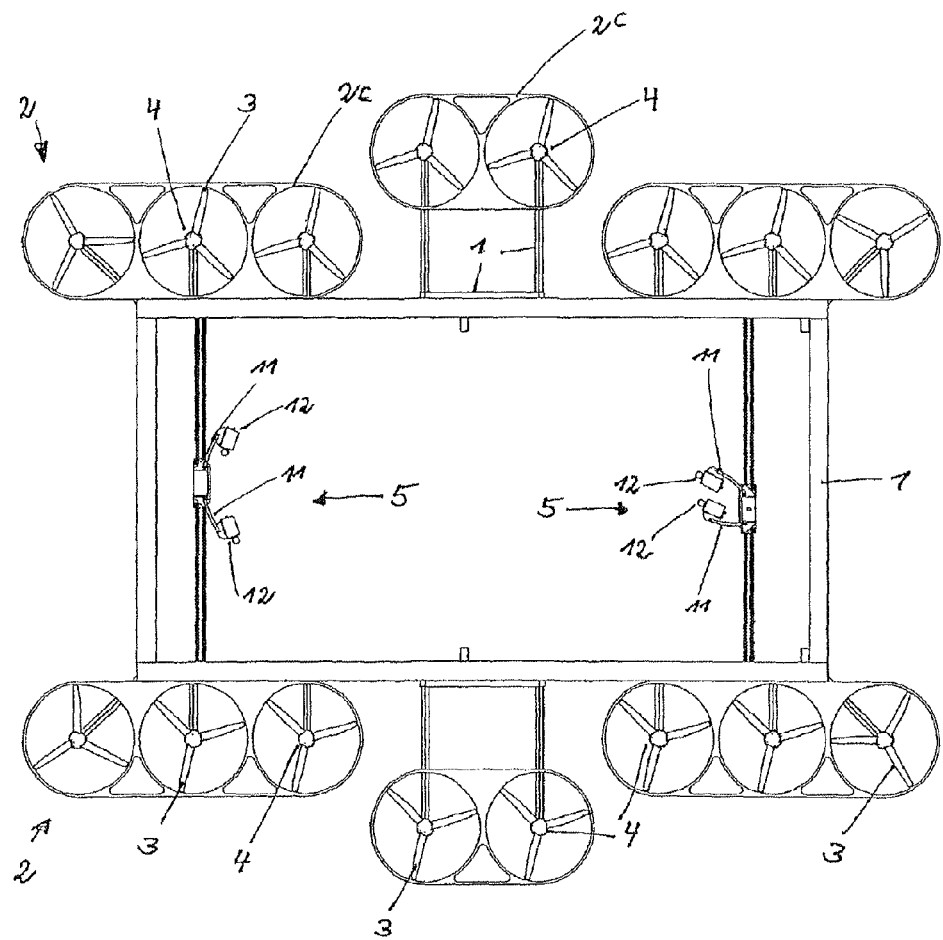
Figure 11:
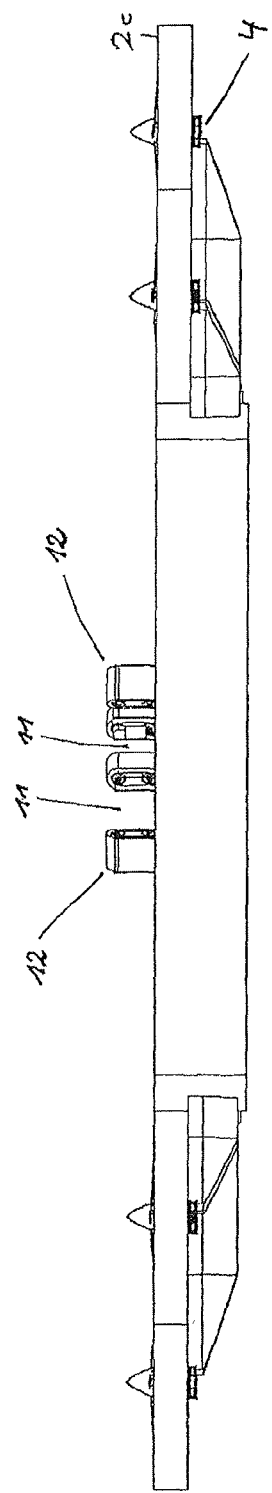
Figure 12:
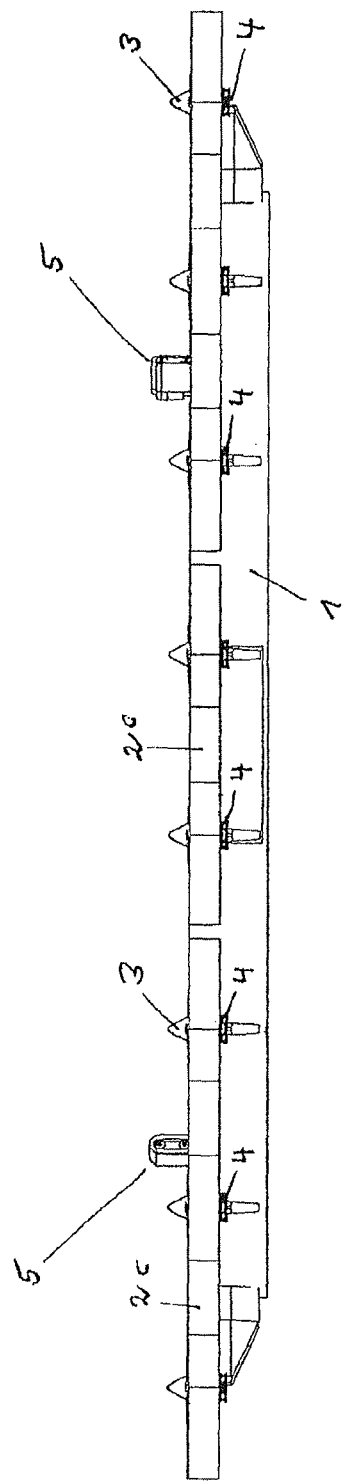

As is illustrated for example in FIG. 7 and also in the other Figures, a guide groove 17 for guiding travel rails 16 is formed in each of the longer side frame members. The travel rails 16 are arranged in parallel to the shorter side members of the frame 1, as shown, and are movable in parallel hereto along the guide grooves 17. Each of the travel rails 16 forms a support which is held to be movable on its two sides in the opposing guide grooves 17 and thus is movable at right angles to the guide grooves 17 extending in parallel to each other.

On each travel rail 16 at least one clamping jaw system, i.e. one of the docking systems 5, is arranged including the arms 11 and being displaceable along the travel rail 16 in parallel to the shorter frame side passively or in the case of motor drive also actively such that it can be adjacent to the rotor blade 8 from both sides and can perform lateral movements along the travel rail 16 (in a travel rail extension direction defined as X direction) during the vertical upward or downward movement of the robot. By the movable arrangement of the travel rails 16 in the guide grooves 17 the respective clamping jaw systems moreover can perform movements transversely to the X direction while approaching or removing from the longitudinal rotor blade axis, i.e. in the Y direction, during vertical upward or downward movement of the rotor so that an X-Y guide of the clamping jaw systems 5 in the horizontal is achieved.

Also a power cable or a power rail 18 for power supply of the electric motors of the clamping jaw systems, i.e. the docking systems 5, which is connected to the control device 9, the electric motors 19 and further components of the robot, where appropriate, can be arranged in at least one of the guide grooves 17 extending in parallel to each other and/or in at least one of the travel rails 16. In addition, at this location or else at a different location a data cable for transmitting control signals or measuring values can extend from or to the control device 9' which is connected to the control device 9' and the sensors and, where appropriate, further components of the robot.

The power supply of the aerodynamic drive 2 consisting of a plurality of propellers 3 including a motor drive 4 is carried out via the cable 7 which simultaneously can serve as data cable. The cable 7 transmits control signals from a control and evaluation station on the ground to the robot and further transmits the measuring signals formed by the system 5 and indicating the state of the rotor blades to the control and evaluation station on the ground. In this way there is no need to carry along heavy accumulators. The required voltage and the necessary current, resp., is generated via the rectifier provided in the carrier module, the control 9 or the device 9' (FIG. 7).

In the embodiment according to FIGS. 1 to 6, the e.g. eight propellers 3 of a respective longitudinal side are arranged in line and are combined into two groups each including four propellers which are mutually spaced apart from each other.

In the embodiment according to FIGS. 7 to 12, the e.g. eight propellers 3 of a respective longitudinal side are combined into three groups each including two or three propellers, the propellers of two groups, e.g. the two outer groups, being arranged in line and the central group, for example, which includes e.g. two propellers is arranged on a support or rack 2a in a laterally projecting mariner so that it has a larger distance from the vertical central plane of the robot than the two other groups. This can further improve the flying stability.

The supports 2a may be U-shaped including laterally projecting extensions 2b at the ends of which the propeller motors are disposed. The respective groups may have inherent lateral frames 2c enclosing the group and the dedicated propellers and entail high stability.

Generally speaking, in this embodiment at each of the two longitudinal sides of the frame construction at least one respective propeller or a group of propellers, preferably the central group, may be arranged in a laterally projecting manner so that the propeller or said propeller group has a larger distance from a vertical plane or central plane extending through the robot in parallel to the longitudinal sides of the frame than the group(s) laterally adjacent to said group which is/are disposed at the respective longitudinal side of the frame construction.

Embodiments of the invention involve the use of robots provided with advanced inspection technology for complete state detection of the rotor blades of wind energy installations. The robot serves for inspecting the rotor blades of wind energy installations. Also, offshore application is possible.

A visual surface inspection is carried out by video and, resp., via camera. The surface can be inspected, for example, by infrared thermography and/or ultrasonic inspection technology, e.g. for offshore application.

Low-maintenance brushless DC electric motors (BLDC) available in industry including electronically speed-controlled drives and control technology can be applied. The rotor blade service is maximally automated by the "Hovering Blade Scanner" robot.

The basis in one, several or all embodiments is formed by a carrier module comprising aerodynamic drive which is applicable to different WEI types. It is not necessary to enter the gondola/blades outdoor. A fully automated cycle and positioning at the blade is ensured. The allocation of workforce is restricted to one/two skilled workers. The expenditure in time of an inspection is restricted to a maximum of 2 hours for each WEI.

The HBS functional principle is based on the fact that the weight of the system during the entire application is absorbed by the aerodynamic drive for rising from the ground to the rotor blade, the inspection cycle at the rotor blade and the descent from the rotor blade to the ground. During the inspection process at the rotor blade the guiding/docking system ensures correct positioning of the carrier module including the integrated state detection technology. At the same time, the guiding/docking system assumes the tracking of the contours of the rotor blade. The automated control of both systems (aerodynamic drive technology and guiding & docking system) results in a statically stable overall system.

The drive unit(s) including propellers can be detachably arranged on the support frame (frame construction) which is beneficial to transport. The carrier module (frame construction) can be made of a CFRP frame.

Rotor blade state detection can be carried out by means of active thermography. A modular design of the robot provided in one, several or all embodiments, HBS "Hovering Blade Scanner" system, offers extended options of application.

The robot can be used at the same time for onshore & offshore application when the basic frame is modified.

The rotor blade state detection can be carried out by means of active thermography and/or according to the principle of optically excited lock-in thermography.

The method of optical lock-in thermography (LIT) is based on the thermal flow analysis so that it can also be referred to as thermal flow thermography. The surface of the object inspected can be heated by halogen lamps disposed at the robot. The thermal flow generated in this way into the material is varied by thermal obstacles such as impacts, delamination or variations of material thickness of the object. "Hot spots" that are detected in an imaging manner by infrared camera are formed on the surface by heat accumulation.

The sensitivity of the method is very high by the use of the lock-in technology. The intensity of the halogen lamps can be modulated in sinusoidal form and simultaneously the surface temperature can be recorded. From the image sequence measured a phase and amplitude image is calculated by means of Fourier transformation. In the phase image interfering effects due to different emission coefficients or non-homogenous excitation are definitely reduced. Now the information on the state of the interface and/or the material thickness or the coating thickness is possible.

In one, several or all embodiments, the optically excited lock-in thermography can be applied.

The optically excited lock-in thermography is a contactless non-destructive inspection technique which is perfectly suited for characterizing fiber-reinforced plastic materials (CFRP). The method permits short measuring times. Large areas of complicated geometry can be inspected by one measurement. The lock-in technology is very robust and also functions under difficult ambient conditions. The method permits e.g. the inspection of CFRP/other fiber-reinforced composites (delamination, impacts, inclusions and porosity, connection of inserts, resin/fiber content, preform analysis, fiber direction determination . . . ), corrosion inspection, wall thickness measurements, inspection of bonded connections, inspection of plastic welded joints during rotor blade inspection of wind energy installations.

In one, several or all embodiments, the robot, such as the carrier module including aerodynamic drive technology, or alternatively the ground station, or a central station, includes also the software for the inspection system and/or the software for the state detection system.

The robot according to the invention, also referred to as HBS system, is adapted to replace and automate the applied "viewing and knocking technology" so as to meet the requirements of the recurring WEI blade inspections.

The recurring WEI blade inspections now can be carried out in an automated manner without the need of skilled workers. Upon completion of the in situ blade inspection, records can be prepared and transmitted to the responsible company, wherein appropriate inspection records can be prepared which then are forwarded to the ordering party. This procedure satisfies the industrial standard so as to meet the requirements of the annually recurring blade inspections.

In one, several or all embodiments, the active thermography (lock-in thermography, 1.-2.) can be applied to rationalize the technology. For the blade inspection preferably the system mentioned hereinafter under 1. can be extended by the system mentioned under 2. and the alternatives of non-destructive inspection by active thermography listed under 3, and 4. can be applied:

1. Optically excited lock-in thermography: use of IR cameras, excited by halogen lamp emitters (optical waves) extendable by the subsequent alternative 2.

2. Ultrasonic thermography: Use of IR cameras excited by ultrasound (thermal response) "extendable by system 1"

3. Pulse thermography: Use of IR cameras excited by arc and flash lamps (thermal response), "extendable by system 1"

4. Shearography: Use of CCD cameras (charge coupled device), excited by laser (heat—vacuum—vibration).

The principle of the optically excited lock-in thermography being applied or applicable in one, several or all embodiments, i.e. the method of optical lock-in thermography (LIT), is based on thermal flow analysis. Frequently it is also referred to as thermal flow thermography. The surface of the object inspected is heated by halogen lamps. The thermal flow into the material generated in this way is modified by thermal obstacles such as impacts, delamination or material thickness variations of the object.

Due to heat accumulation "hot spots" which are detected in an imaging manner by an infrared camera are formed on the surface. The sensitivity of the method is very high due to the use of the lock-in technology. The intensity of the halogen lamps is modulated in sinusoidal shape and simultaneously the surface temperature is recorded. From the image sequence measured a phase and amplitude image is calculated by means of Fourier transformation. In the phase image interfering effects due to different emission coefficients or non-homogenous excitation are clearly reduced. Now the information on the state of the interface and/or the material thickness or the coating thickness is possible.

The optically excited lock-in thermography used in one, several or all embodiments is a contactless, non-destructive inspection method which is perfectly suited for characterizing fiber-reinforced plastic materials (CFRP). The method is applied especially when short measuring times are required. Large areas of complicated geometry can be inspected by one measurement. The lock-in technology is very robust and works even under difficult ambient conditions. The method is applied both in production and in maintenance. OTvis is extendable by all other Edevis excitement sources and software modules. In this way proper rotor blade inspection of wind energy installations is possible.

In one, several or all embodiments, ultrasonic thermography can be used. In ultrasonic thermography heavy-duty ultrasound is applied to the object inspected. Material defects such as cracks or other mechanical interfaces generate friction losses in the material. On the surface "hot spots" detected by an infrared camera are thus formed. The sensitivity of the method can be clearly increased by the phase technology. The intensity progression of the surface temperature is spectrally analyzed by means of Fourier transformation and is split into a phase image and an amplitude image. In the phase image interfering effects that are due to different emission coefficients or non-homogenous excitation are definitely reduced. The thermography excited by ultrasound is a non-destructive inspection method which is perfectly suited for characterizing rotor blades, e.g. non-metallic and metallic structures. The method is applied especially for the detection of defects that can be activated by sound introduction. These include in particular cracks and joining defects.

The principle of pulse thermography applied in one, several or all embodiments is based on the fact that the surface of the object inspected is shortly strongly heated by flash lamps. In pulse thermography the thermal flow caused by the flash excitation plays a significant role. Thermal obstacles (e.g. variations in thickness or material faults) vary the thermal flow.

Differences in temperature which are detected by a high-speed infrared camera are formed on the surface. The sensitivity of the method can be further increased by pulse-phase technology. The intensity progression of the surface temperature is spectrally analyzed by means of Fourier transformation and is split into a phase image and an amplitude image. The phase image permits quantitative information on particular material properties with the aid of calibrations.

The pulse thermography is a contactless inspection method which is excellently suited for contactless characterization of thin layers or coatings/varnishes and delamination. The very short inspection period and the high detection sensitivity render pulse thermography an extremely efficient tool in non-destructive rotor blade inspection. The pulse phase evaluation technology permits the quantitative determination of material properties such as thickness, porosity or temperature conductivity. Moreover interferences such as varying surface characteristics or uneven heating are suppressed in this way. The interpretation and documentation of inspection results is very simple. The PTvis system based on heavy-duty flash lamps has a modular structure and can be extended by further types of excitement (UTvis, ITvis, OTvis . . . ).

Arc and flash lamps are employed for a number of different purposes, such as for precise measurement of distances, for laser excitation in industry as well as for applications in cosmetic medicine and for solar simulation.

In one, several or all embodiments, also the principle of shearography can be employed. Shearography is an interferometric non-destructive inspection method. The phase difference between two light waves exhibiting an optical path difference is established. All object characteristics that vary the optical path (i.e. especially deformations of the surface) can be precisely detected and imaged by a resolving power better than the wavelength used. Shearography is a contactless non-destructive inspection method which is perfectly suited for characterizing composite materials such as fiber-reinforced plastics (CFRP). The method permits inspecting complicated material structures such as honeycomb-sandwich components or foamed components. Large areas can be examined by one measurement.

In one, several or all embodiments, electromagnetic radiation, e.g. light, or infrared radiation can be employed. The infrared optical systems may be made e.g. of germanium. Such infrared camera permits—with certain limitations—viewing through atmosphere. In the case of distances of several meters between the infrared camera and the object to be measured, in this case GRP, CFRP and wood, the atmosphere has practically no influence on the measurement under normal conditions. It becomes difficult only with measurements over a larger distance, as the measuring values cannot be corrected by calculation for a detailed damage analysis of composite materials of WEI blades. In the case of the invention these problems do not arise due to the robot-guided near-field measurement directly on the rotor blade.

Direct and intense solar radiation on the object to be measured, even in the case of small distance, may affect the measurement. In this case the WEI blade is put in the service position and is positioned in the shade of the WEI tower.

Figure 13:
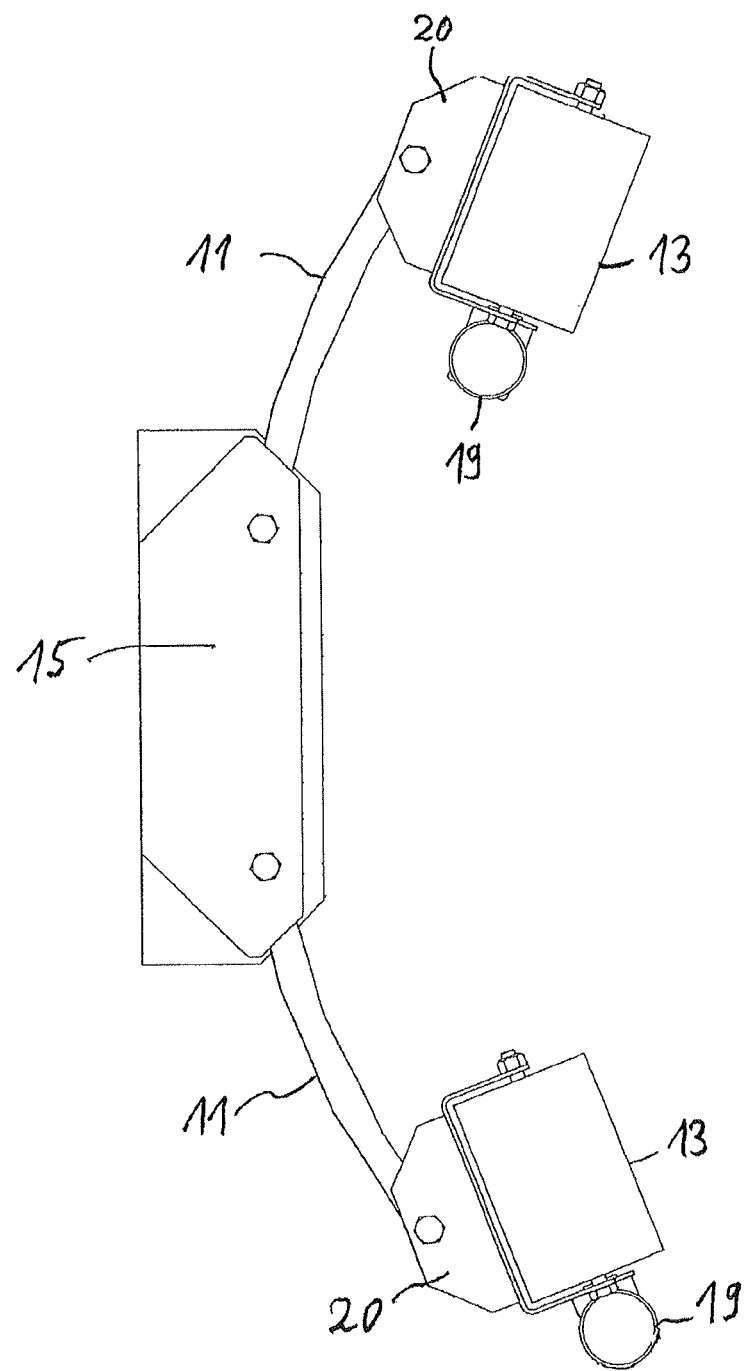
FIGS. 13, 14 show different views of an embodiment of the guiding and docking system 5.
Figure 14:
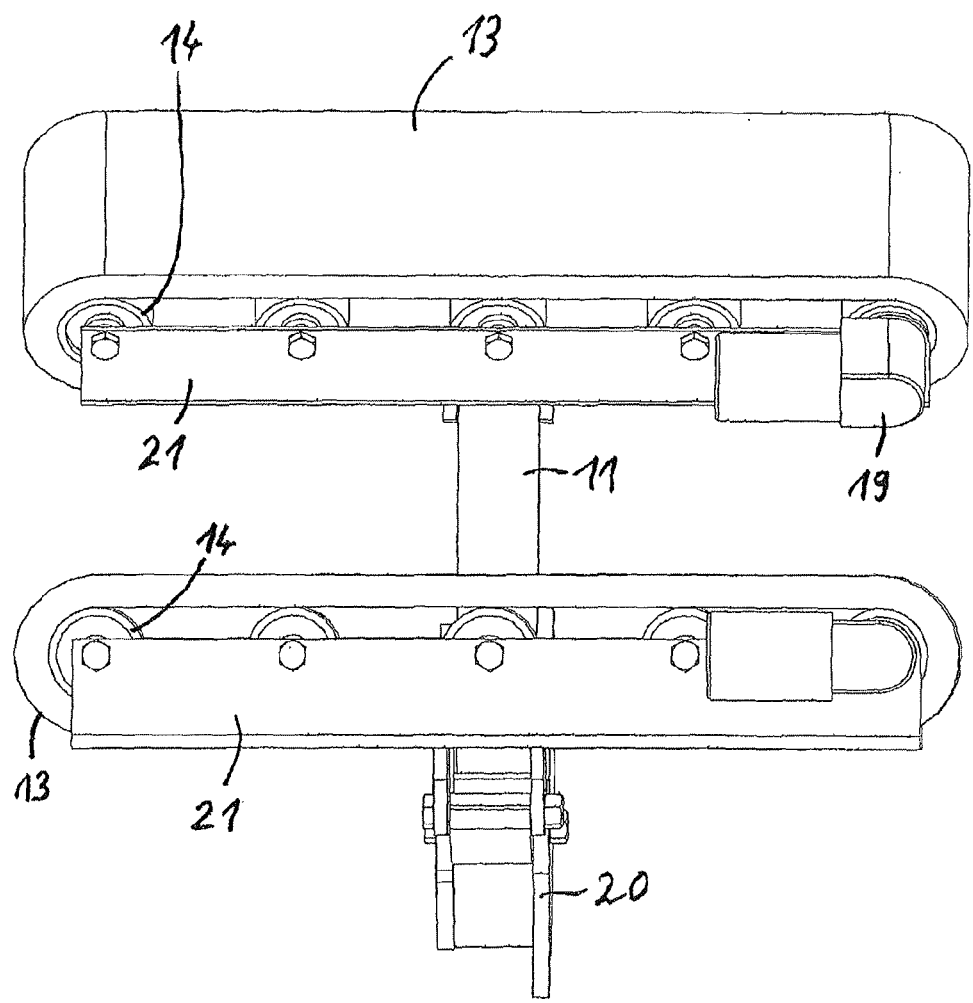

In FIGS. 13, 14 an embodiment of the guiding and docking system 5 is illustrated in greater detail. The robot preferably can comprise two of said systems 5 arranged on two opposing frame portions, e.g. the two shorter frames. In other embodiments also only one, or three or more of said systems 5 may be provided. The or each guiding and docking system 5 includes the spring-biased and/or motor-pivoted arms 11 which are adapted to mechanically contact directly the rotor blade 8 (not shown) and which are pivoted in a head piece 15 movably mountable or mounted on the travel rail 16. The head pieces 15 are mounted e.g. on a respective one of the opposing narrow sides of the frame 1 on the respective travel rails 16 and may comprise springs or electric motors for biasing and/or moving the arms 11 in the closing direction or opening direction.

The arms 11 are articulated at their extremities to pulley carriers 20 in which at least one pulley adapted to be driven by the e.g. laterally mounted electric motor 19 is pivoted.

As is evident from FIG. 14, each pulley carrier 20 supports plural, e.g. five rotatable pulleys 14 (also including rollers or disks) which are juxtaposed in parallel with axes of rotation positioned substantially horizontally in the operating position and are rotatably supported by a bearing sheet 21. The pulleys 14 can be smooth, corrugated, toothed or patterned in any other way so as to obtain form fit with the belt 13. Alternatively, the belt can also be omitted so that the pulleys 14 enter into direct contact with the rotor blade 8 and travel along the rotor blade 8 by the motor drive of at least one of the pulleys 14.

The invention claimed is:

1. A robot for inspecting rotor blades of wind energy installations, the robot comprising:
   a free-floating frame construction that is self-contained and independent of catenary suspensions, the frame construction including an inner opening which surrounds a rotor blade during use;
   a plurality of propellers arranged on the frame construction for a vertical flying movement of the robot, each of the propellers driven by a propeller motor;
   a rotor blade state detection system disposed on the frame construction for a contactless inspection of a rotor blade during use;
   a cable provided for connecting the robot to a station directly or indirectly located on the ground or on a vehicle;
   a docking and/or guiding system for docking and/or guiding the robot to/on a rotor blade, the docking and/or guiding system comprising a guide for moving the robot upwards and downwards along a rotor blade during use, the guide being driven by a guide motor; and
   a control device that jointly controls the propeller motors and the guide motor.

2. The robot according to claim 1, wherein the docking and/or guiding system includes one or more adjustable arms.

3. The robot according to claim 2, wherein the arms of the docking and/or guiding system are spring-biased and/or motor-adjustable.

4. The robot according to claim 2, wherein the arms of the docking and/or guiding system are provided with a coating.

5. The robot according to claim 2, wherein the docking and/or guiding system or the arms thereof include at least one pulley carrier and at least one pulley adapted to be driven by the guide motor, the at least one pulley driving a rotating belt connected to a rotor blade or being in direct contact with a rotor blade to be inspected so as to move the robot upwards or downwards along a rotor blade to be inspected.

6. The robot according to claim 1, wherein the docking and/or guiding system is arranged at the narrow sides of the frame construction.

7. The robot according to claim 1, wherein the control device comprises a rectifier or inverter arranged at the frame construction and serving for conversion of supply voltage fed through the cable.

8. The robot according to claim 1, comprising two or more groups, each group comprising one or more of the plurality of propellers which are arranged on the frame construction.

9. The robot according to claim 1, wherein on each of the two longitudinal sides of the frame construction, at least one propeller of the plurality of propellers is arranged to be laterally projecting such that said at least one propeller extends farther from a vertical plane extending through the rotor in parallel to the longitudinal sides than other propellers of the plurality of propellers laterally adjacent to said at least one propeller of the plurality of propellers which is/are arranged on the respective longitudinal side of the frame construction.

10. The robot according to claim 1 wherein the state detection system includes a camera and/or an ultrasonic inspection device.

11. A system comprising:
    a robot according to claim 1;
    a fixedly or movably installed station; and
    a cable for connecting the robot to the station.

* * * * *